(12) United States Patent
Ponta et al.

(10) Patent No.: US 8,585,949 B2
(45) Date of Patent: Nov. 19, 2013

(54) METHOD FOR EXTRUDING A POLYMERIC MATERIAL

(75) Inventors: Thomas Ponta, Milan (IT); Stefano Testi, Milan (IT); Francesco D'Oria, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 506 days.

(21) Appl. No.: 11/919,136

(22) PCT Filed: Apr. 27, 2005

(86) PCT No.: PCT/EP2005/004500
§ 371 (c)(1),
(2), (4) Date: Feb. 6, 2009

(87) PCT Pub. No.: WO2006/114117
PCT Pub. Date: Nov. 2, 2006

(65) Prior Publication Data
US 2009/0174103 A1  Jul. 9, 2009

(51) Int. Cl.
*B29C 47/00* (2006.01)
*B29C 47/92* (2006.01)

(52) U.S. Cl.
USPC .......... 264/176.1; 264/271.1; 264/209.8; 425/466; 425/146; 425/113; 425/114

(58) Field of Classification Search
USPC ........ 264/167, 177.1, 177.16, 209.8; 425/349
See application file for complete search history.

(56) References Cited

U.S. PATENT DOCUMENTS

| | | | |
|---|---|---|---|
| 3,402,427 A | 9/1968 | Christofas et al. | |
| 3,583,033 A | 6/1971 | Christofas et al. | |
| 3,752,614 A | 8/1973 | Bremer | |
| 3,773,449 A | 11/1973 | Hager | |
| 4,708,837 A | 11/1987 | Baxter et al. | |
| 4,717,326 A * | 1/1988 | Motonaga et al. | 425/133.1 |
| 5,292,472 A * | 3/1994 | Tompkins | 264/171.29 |
| 5,690,971 A | 11/1997 | Buluschek | |
| 6,332,999 B1 * | 12/2001 | Caretta | 264/501 |
| 6,616,783 B2 * | 9/2003 | Senbokuya et al. | 156/117 |
| 6,953,333 B1 * | 10/2005 | Feuerherm et al. | 425/532 |
| 7,041,185 B2 * | 5/2006 | Caretta et al. | 156/117 |
| 7,909,953 B2 * | 3/2011 | Caretta | 156/117 |
| 2001/0045254 A1 * | 11/2001 | Senbokuya et al. | 156/123 |

(Continued)

FOREIGN PATENT DOCUMENTS

| | | |
|---|---|---|
| DE | 21 09 497 A1 | 9/1972 |
| EP | 0 605 767 A1 | 7/1994 |
| EP | 1066948 A1 * | 1/2001 |
| EP | 1 145 835 A2 | 10/2001 |

(Continued)

*Primary Examiner* — Benjamin Schiffman (74) *Attorney, Agent, or Firm* — Finnegan, Henderson, Farabow, Garrett & Dunner, L.L.P.

(57) ABSTRACT

A method for extruding a polymeric material includes the steps of: a) feeding the polymeric material to an extrusion apparatus including an extrusion head, the extrusion head including: a male die; a female die coaxially arranged with respect to the male die; a conveying channel, at least one portion of which is defined between the male die and the female die; and b) adjusting a cross-sectional area of the at least one portion of the conveying channel by reciprocally displacing the female die with respect to the male die in response to an extrusion speed variation of the polymeric material. An extrusion apparatus and a process for manufacturing a tire which uses the extrusion apparatus, are also disclosed.

13 Claims, 6 Drawing Sheets

(56) References Cited

U.S. PATENT DOCUMENTS

| | | | |
|---|---|---|---|
| 2002/0029841 A1* | 3/2002 | Caretta et al. | 156/123 |
| 2003/0080461 A1* | 5/2003 | Kirjavainen | 264/173.16 |
| 2004/0159964 A1* | 8/2004 | Lavoie et al. | 264/40.1 |
| 2006/0162847 A1* | 7/2006 | Caretta | 156/117 |

FOREIGN PATENT DOCUMENTS

| | | |
|---|---|---|
| EP | 0 976 533 B1 | 11/2002 |
| EP | 0 928 680 B1 | 3/2003 |
| GB | 2 060 473 A | 5/1981 |

\* cited by examiner

METHOD FOR EXTRUDING A POLYMERIC MATERIAL

CROSS REFERENCE TO RELATED APPLICATION

This application is a national phase application based on PCT/EP2005/004500, filed Apr. 27, 2005, the content of which is incorporated herein by reference.

BACKGROUND OF THE INVENTION

Field of the Invention

The present invention relates to a method for extruding a polymeric material.

In particular, the present invention relates to a method for extruding an elastomeric material to be used in tyre manufacturing processes.

The invention further relates to an extrusion head for extruding a polymeric material and to an extrusion apparatus which comprises said extrusion head.

Description of the Related Art

A preferred field of application of the present invention is a process for manufacturing a tyre wherein elastomeric sheets or strip-like elements, possibly reinforced with metallic or synthetic thread-like elements, are used for producing tyre constitutive elements such as, for example, a carcass ply, a belt layer, a sidewall, a bead core.

A tyre generally comprises: a carcass structure comprising at least one carcass ply, the ends of which are folded back or secured to two annular reinforcing elements, i.e. the so-called "bead cores"; a tread band; a belt structure placed between the carcass structure and the tread band; and a pair of sidewalls applied to said carcass structure in axially opposite positions.

The tyre portion which comprises the bead core is known as "bead" and performs the function of fixing the tyre on a respective mounting rim.

Generally, in a position radially external to said bead core, the bead comprises a rubber strip, conventionally called "bead filling" or "bead apex", which has a substantially triangular cross-section and extends radially outwardly from the respective bead core.

In conventional manufacturing processes, the tyre constitutive elements are made by using semi-finished products, i.e. continuous sheets of elastomeric material—possibly in combination with reinforcing elements such as steel or textile cords—that are prepared separately and in large quantities previously to the tyre assembling operations.

According to said conventional processes, for each tyre constitutive element, the manufacturing process comprises the steps of winding a predetermined elastomeric sheet onto a building drum, cutting (or in some cases pre-cutting) said sheet into a length approximately equal to the circumference of the drum, and joining the circumferentially opposite ends of said sheet length directly on the building drum.

In more recent times particular attention has been given to production methods that eliminate or at least remarkably reduce the preliminary production of said semi-finished products. For example, European patent N. 928,680 in the name of the same Applicant discloses the manufacturing of a green tyre by consecutively producing and assembling together on a toroidal support the tyre constitutive elements. In detail, the tyre is manufactured by axially overlapping and/or radially superimposing turns (coils) of a strip-like element on the toroidal support, said strip-like element being a strip of an elastomeric material only, or a strip of elastomeric material embedding reinforcing elements thereinto, typically textile or metal cords, or a rubberized metal wire or cord.

According to said further process, the toroidal support is moved, preferably by a robotized system, between a plurality of work stations in each of which, through automated sequences, a particular building step of the tyre is carried out.

The manufacturing process further comprises the successive step of moulding the green tyre, so as to confer to the latter a desired tread pattern, and the step of curing the green tyre, so as to confer to the latter a desired geometrical conformation which is obtained by curing the elastomeric material forming the tyre.

The moulding and curing steps of the green tyre are carried out by introducing the green tyre into a moulding cavity defined within a vulcanization mould, whose shape matches the shape of the outer surface of the tyre to be obtained, and by introducing a fluid under pressure into a diffusion interspace (or diffusion gap) provided between the inner circumferential surface of the green tyre and the toroidal support. Such a tyre manufacturing process is described, for instance, in European Patent EP-976,533 in the name of the same Applicant.

In the following description, the term "extruded element" is used to indicate either a strip-like element or a sheet. In particular, the term "extruded element" is used to indicate a strip-like element or a sheet which is made of a polymeric material or which is reinforced with at least one thread-like element. The term "thread-like element" is used to indicate an element whose longitudinal dimension is substantially greater than its transversal dimension, the thread-like element comprising one or more reinforcing elements, each reinforcing element consisting of a textile or metallic filament or cord. In case the strip-like element or the sheet is made of a polymeric material, the strip-like element or the sheet is preferably obtained by extrusion. In case the strip-like element or the sheet is reinforced with at least one thread-like element, the strip-like element or the sheet is preferably obtained by extruding a polymeric material onto at least one thread-like element advancing through an extrusion apparatus.

Generally, an extrusion apparatus comprises an extrusion head which includes: a male die; a female die, coaxially arranged with respect to the male die; and a distributor element for uniformly distributing the extruded material into a conveying channel which is provided between the male die and the female die.

In case the extruded element is reinforced with at least one thread-like element, the male die is usually provided with an inner cavity coaxially extending with respect to a longitudinal axis of the extrusion head, said cavity being suitable for receiving said at least one thread-like element advancing along a direction substantially parallel to said longitudinal axis. The polymeric material flowing into the conveying channel is thus deposited onto said at least one thread-like element advancing through the extrusion apparatus.

Document U.S. Pat. No. 3,752,614 discloses an extrusion head for forming insulated wire which includes a fixed threaded hollow mandrel and a threaded hollow pin disposed internally of, and in mating engagement with, the mandrel for supporting a male die member in axial alignment with a female die member mounted within the head. The threaded portions of the mandrel and the pin are so engaged that rotation of the pin within the mandrel advances or retracts the male die member with respect to the female die member while maintaining the alignment therebetween. This device allows to compensate for changes in the extruded plastic material, insulation thickness, or in the pressure or temperature of the system while the extrusion head is in operation. The relative movement between the male die member and the female die member is effected by an operator by manual control.

Document U.S. Pat. No. 3,583,033 discloses a die for in-line extrusion of viscoelastic and viscous thermoplastic materials, comprising a conical male valve member which is advanced or retracted with respect to a conical seat to vary the degree of shear and back pressure to which the material is exposed in passing through the annular conical passageway. The movement of the conical male valve member is achieved by rotating a ring nut and is manually effected and controlled by an operator.

Document GB-2,060,473 discloses a head for extruding tubes for blow moulding, including a mandrel supported by one part, the other part comprising at least one conical wall portion which, with a corresponding mandrel wall portion, forms a conical flow space section whose throughflow cross-section can be varied by the relative displacement of the two telescopically engaging parts. The relative displacement is manually effected by the operator by means of an adjusting screw associated with one part of the mandrel and engaged with a suitable screwthread formed on the other part of the mandrel. It is described that various remote controlled servo devices could conceivably be used in place of the adjusting screw.

Document U.S. Pat. No. 3,402,427 discloses a crosshead die body apparatus including a shaping die for extruding and shaping thermoplastic material comprising polyvinylidene fluoride resin, wherein the crosshead die body has at least two externally adjustable internally axially positioned frusto-conically shaped valving means and at least one annular orifice portion of fixed uniform annular width and of substantially fixed but adjustably variable length located axially between said valving means, whereby the pressure drop and shearing stress between the extruder outlet and the shaping die may be progressively and precisely controlled. During start-up of the coating process, the surface and body characteristics of the extrudate are observed by the operator of the machine and are modified by manipulation of the valving means until the optimum extrudate characteristic are obtained. Then, by continued observation and manipulation of the valving means, either by manual or automatic control, the optimum characteristics can be maintained by the operator throughout the extruding and shaping operation without reaching or exceeding the yield point of the resin.

The Applicant has noted that in case the step of extruding a polymeric material to obtain an extruded element is part of a complex process, such as a tyre manufacturing process, generally the extrusion speed of said material needs to be regulated on the basis of the process step subsequent to the extrusion step, while the extrusion apparatus is continuously fed with the polymeric material to be extruded.

In particular, in the more recent tyre manufacturing processes—disclosed, for instance, in European patent N. 928, 680 mentioned above—wherein the tyre constitutive elements are produced and consecutively assembled on a toroidal support while the tyre is being manufactured so that the storage of semi-finished products is substantially avoided, the Applicant has noted that the extrusion speed needs to be increased when the extruded elements—which are used for forming a specific tyre component—have to be obtained and applied onto the tyre being manufactured, and, on the contrary, the extrusion speed needs to be decreased when the extruded elements do not have to be deposited so that waste of raw materials is avoided or at least remarkably reduced.

SUMMARY OF THE INVENTION

The Applicant has noted that the regulation of the extrusion speed has to be carried out while ensuring that the extruded elements maintain the desired quality.

In fact, the Applicant has noted that the quality of the extruded elements remarkably influences the quality of the tyre reinforcing structures including said extruded elements. Therefore, great attention and care have to be paid to the production of the extruded elements in case the latter are reinforced with thread-like elements.

In particular, uniformity and homogeneity of the extruded material in the production of the extruded elements have to be carefully controlled and a substantially constant thickness thereof has to be ensured so that uniformity of the tyre is guaranteed. Moreover, in case the extruded elements are reinforced with thread-like elements, great attention and care have to be paid in order to obtain extruded elements wherein the polymeric coating layer uniformly adheres to the thread-like elements so that the thickness of the coating layer is substantially constant along the longitudinal extension of the extruded elements.

The Applicant has noted that the quality of the extruded elements depends on the geometry of the extrusion head and, at a predetermined geometry thereof, on the physico-chemical characteristics of the extruded material as well as on the process parameters of the extrusion process.

For example, particular care is required when polymeric materials that are sensitive to temperature are used. In fact, scorching at high temperatures and/or clots at low temperatures can arise, principally if long periods of permanency thereof are caused to occur in the extrusion head. Scorching and clots need to be avoided since they negatively influence uniformity and homogeneity of the extruded elements, and thus of the tyre reinforcing structures including said extruded elements. Moreover, said defects can cause the extrusion process to be stopped in order to allow the extrusion head to be cleaned from the clots and/or the scorched material.

Furthermore, the Applicant has noted that stagnation zones of the polymeric material can originate in the extrusion head, particularly when small flow rate values of the polymeric material occur, for instance when the output of the extrusion process is decreased. As a consequence, the period of permanency of the polymeric material in the extrusion head increases and, as mentioned above, scorching or overheatings of said material can occur.

Moreover, the Applicant has noted that, at a predetermined and constant extrusion speed of the extruded elements, a remarkable decrease of the flow rate of the polymeric material flowing through the extrusion head can also cause the formation of very thin extruded elements and, sometimes, can even cause the breakage thereof. In case the extruded elements are reinforced with thread-like elements, areas of the outer surface thereof can be even devoid of the extruded material. On the contrary, at a predetermined and constant extrusion speed of the extruded elements, a remarkable increase of the flow rate of the polymeric material flowing through the extrusion head can cause the formation of too thick extruded elements.

The Applicant has noted that a variation of the extrusion speed, which is chosen in response to the process step subsequent to the extrusion step, causes a variation of the flow rate of the extruded polymeric material and, consequently, a variation of the pressure inside the extrusion head.

In the present description and in the following claims the term "extrusion speed" is used to indicate the linear velocity of the polymeric extruded element exiting from the extrusion head. In case the extruded element consists only of the polymeric material (i.e. the extruded element does not embed any reinforcing element), the extrusion speed can be varied by modifying the rotational speed of the extruder screw. In case the extruded element comprises at least one thread-like element embedded in the polymeric material, the extrusion speed can be generally varied by modifying the linear velocity of the at least one thread-like element.

In particular, the Applicant has noted that an increase of the extrusion speed requires an increase of the flow rate of the extruded polymeric material and thus causes an increase of the pressure inside the extrusion head. Therefore, in order not to mechanically stress the extrusion head and not to scorch the polymeric material, the flow rate of the polymeric material needs to be kept below a predetermined maximum value, fact which inevitably limits the maximum extrusion speed value. On the other side, a decrease of the extrusion speed requires a decrease of the flow rate of the extruded polymeric material and thus causes a decrease of the pressure inside the extrusion head. As a consequence, the period of permanency of the polymeric material in the extrusion head increases and, as mentioned above, scorching of the polymeric material as well as formation of stagnation zones can occur. Therefore, the flow rate of the polymeric material needs to be kept over a predetermined minimum value, fact which inevitably limits the minimum extrusion speed value.

The Applicant has perceived the need of increasing the operative range of the flow rate of the polymeric material to be extruded so that the range of variation of the extrusion speed can be remarkably increased and can be suitably fitted to the working conditions of the process step subsequent to the extrusion step.

In particular, the Applicant has perceived that the above goal can be achieved by modifying the geometry of the extrusion head during the extrusion process, the variation of geometry of the extrusion head being carried out in response to the working conditions of the process step subsequent to the extrusion step.

In detail, the Applicant has found that, once the desired range of variation of the extrusion speed has been chosen on the basis of the working conditions of the process step subsequent to the extrusion step, the extrusion head can operate at the corresponding operative range of the flow rate of the polymeric material to be extruded by adjusting the cross-sectional area of the conveying channel in response to the actual flow rate flowing through the extrusion head, and thus in response to the actual extrusion speed which is required in the specific phase of the extrusion process.

In a first aspect the present invention relates to a method for extruding a polymeric material, said method comprising the steps of:
  feeding said polymeric material to an extrusion apparatus including an extrusion head, said extrusion head comprising:
    a male die;
    a female die, coaxially arranged with respect to said male die, and
    a conveying channel, at least one portion of which being defined between said male die and said female die;
  adjusting a cross-sectional area of said at least one portion of the conveying channel by reciprocally displacing said female die with respect to said male die in response to an extrusion speed variation of said polymeric material.

In accordance with the present invention, since the cross-sectional area of the conveying channel is adjusted in response to the variation of the extrusion speed, critical flow conditions can be avoided and thus scorching or overheating of the polymeric material as well as the formation of stagnation zones in the extrusion head or mechanical damages thereof can be avoided or at least substantially reduced.

In other words, according to the present invention the geometry (i.e. the cross-sectional area) of the conveying channel can be automatically adapted to the different flow conditions of the polymeric material by means of a reciprocal displacement of the female die with respect to the male die.

In fact, according to the present invention, an increase of the extrusion speed requires a corresponding increase of the flow rate of the polymeric material to be extruded and thus causes a corresponding increase of the pressure in the extrusion head. The resulting pressure increase has the effect of axially displacing the female die from the male die so that the cross-sectional area of the conveying channel increases and the pressure losses in the conveying channel decrease. As a result of the conveying channel cross-section variation, the pressure increase in the extrusion head can be limited and the desired flow rate value of the polymeric material can be guaranteed. On the contrary, a decrease of the extrusion speed requires a corresponding decrease of the flow rate of the polymeric material to be extruded and thus causes a corresponding pressure decrease and an increase of the period of permanency of the polymeric material in the extrusion head. The resulting pressure decrease has the effect of axially moving the female die towards the male die so that the cross-sectional area of the conveying channel decreases and the pressure losses in the conveying channel increase. As a result of the conveying channel cross-section variation, the period of permanency of the polymeric material in the extrusion head can be suitably controlled and the desired flow rate value of the polymeric material can be guaranteed.

According to the method of the present invention, the step of adjusting the cross-sectional area of at least one portion of the conveying channel by reciprocally regulating the position of the female die with respect to the male die comprises the step of partially counteracting the force exerted on at least one die by the polymeric material flowing in the conveying channel.

Preferably, the step of adjusting comprises the step of partially counteracting the force exerted on the female die by the polymeric material flowing in the conveying channel.

Preferably, the counteracting force is substantially parallel to the extrusion head longitudinal axis.

According to an embodiment of the present invention, the step of partially counteracting the force exerted on at least one die is carried out by means of a resilient element acting on said at least one die along said longitudinal axis.

Preferably, said resilient element is associated with the at least one die which is allowed to be axially displaced.

Preferably, said resilient element is a spring whose elastic constant K is selected in response to a predetermined range of variation of the extrusion speed.

The method of the present invention further comprises the step of extruding the polymeric material.

The method of the present invention further comprises the step of choosing the extrusion speed variation of the polymeric material in response to working conditions of a process step subsequent to the extrusion step.

According to a further embodiment, the method of the present invention further comprises the steps of:
  detecting a variation of at least one parameter indicative of the polymeric material flow conditions, the variation of said at least one parameter being associated to the extrusion speed variation of said polymeric material, and
  adjusting the cross-sectional area of at least one portion of the conveying channel in response to the detected variation of said at least one parameter.

Preferably, said at least one parameter indicative of the polymeric material flow conditions is the pressure. Preferably, the pressure is detected in the extrusion head.

Preferably, said at least one parameter indicative of the polymeric material flow conditions is detected with a predetermined frequency value. Alternatively, said at least one parameter is continuously detected.

Preferably, the step of detecting the variation of at least one parameter indicative of the polymeric material flow conditions comprises the step of generating a signal representative of said variation by means of a sensor acting on said polymeric material flowing through the extrusion head.

Preferably, the step of adjusting the cross-sectional area of the conveying channel comprises the steps of:
- calculating a second position of at least one die in response to a variation of said extrusion speed occurring at a first position, and
- moving said at least one die to said second position.

Preferably, the step of calculating comprises the step of calculating the second position of the female die and the step of moving comprises the step of moving the female die to said second position.

Preferably, the step of moving said at least one die to said new position is carried out by means of an actuator device. Preferably, the actuator device is associated with said at least one die and said sensor.

Preferably, the method of the present invention is suitable for extruding a cross-linkable material, the latter being particularly sensitive to temperature variations.

In a second aspect thereof, the present invention relates to an apparatus for extruding a polymeric material, said apparatus including an extrusion head which comprises:
- a male die;
- a female die, coaxially arranged with respect to said male die;
- a conveying channel, at least one portion of which being defined between said male die and said female die, and
- a device for adjusting a cross-sectional area of said at least one portion of said conveying channel by reciprocally displacing said female die with respect to said male die in response to an extrusion speed variation of said polymeric material.

Preferably, the male die is provided with an inner cavity coaxially extending with respect to a longitudinal axis of the extrusion head, said cavity being suitable for receiving at least one thread-like element which is used for reinforcing an extruded element.

In a first embodiment of the extrusion apparatus of the present invention, the device for adjusting the cross-sectional area of said conveying channel comprises a resilient element which acts on at least one die and partially counteracts the force exerted on said at least one die by the polymeric material flowing in the conveying channel.

Preferably, said resilient element is associated with the female die.

Preferably, said resilient element is a spring whose elastic constant K is selected in response to the desired range of variation of the extrusion speed.

According to a further embodiment of the extrusion apparatus of the present invention, the device for adjusting the cross-sectional area of said conveying channel is a servo-device for detecting the variation of at least one parameter indicative of the polymeric material flow conditions (the variation of said at least one parameter being associated to the extrusion speed variation of said polymeric material) and for adjusting said cross-sectional area on the basis of the detected variation of said at least one parameter.

Preferably, said servo-device comprises a sensor acting on said polymeric material and generating a signal representative of the variation of said at least one parameter.

Preferably, said sensor detects a pressure variation of the polymeric material flowing through the extrusion head.

Preferably, said servo-device further comprises a device for calculating a new position of at least one die and a device for moving said at least one die to said new position.

Preferably, the device for moving said at least one die to said new position is an actuator device. Preferably, said actuator device is associated with said at least one die and a position sensor. The position sensor has the function of detecting the position of said at least one die.

According to a preferred embodiment, said actuator device comprises a hydraulic device.

According to a further embodiment, said actuator device comprises a pneumatic device.

According to a further embodiment, said actuator device comprises a gear electro-mechanical device.

According to a further embodiment, said actuator device comprises a linear actuator.

In a third aspect thereof, the present invention relates to a process for manufacturing a tyre, said process comprising the steps of:
- forming a crude tyre on a supporting device;
- moulding said crude tyre, and
- curing said crude tyre, wherein the step of forming the crude tyre comprises the step of extruding at least one elastomeric material, the step of extruding comprising the steps of:
- feeding said elastomeric material to an extrusion apparatus including an extrusion head, said extrusion head comprising:
  - a male die;
  - a female die, coaxially arranged with respect to said male die, and
  - a conveying channel, at least one portion of which being defined between said male die and said female die;
- adjusting a cross-sectional area of said at least one portion of the conveying channel by reciprocally displacing said female die with respect to said male die in response to an extrusion speed variation of said elastomeric material.

Preferably, the step of forming the crude tyre comprises the step of extruding at least one elastomeric material in the form of a strip-like element to be deposited onto the crude tyre being manufactured. In this case, preferably the supporting device is a toroidal support.

Alternatively, the step of forming the crude tyre comprises the step of extruding at least one elastomeric material in the form of a sheet to be deposited onto the crude tyre being manufactured. In this case, preferably the supporting device is a building drum.

Throughout the present description and the following claims, the term "elastomeric material" is used to indicate a composition comprising at least one elastomeric polymer and at least one reinforcing filler. Preferably, the composition further comprises additives, such as a cross-linking agent and/or a plasticizer.

The method of the present invention can be advantageously used either for extruding a semi-finished product (in the form of a sheet) to be used in a conventional tyre manufacturing processes, or for extruding strip-like elements which are employed in more recent tyre manufacturing processes as described above.

However, the present invention can be also applied to technical fields different from a tyre manufacturing process. In particular, the present invention can be applied to any technical field wherein the extrusion of a polymeric material—to obtain an extruded element—is required.

BRIEF DESCRIPTION OF THE DRAWINGS

Further characteristics and advantages of the present invention will become clearer from the description made hereafter with reference to the attached drawings in which, for illustrative and non limiting purposes, four embodiments of an extrusion head for carrying out the method of the present invention are shown. In the drawings.

DETAILED DESCRIPTION OF THE INVENTION

Figure 1:
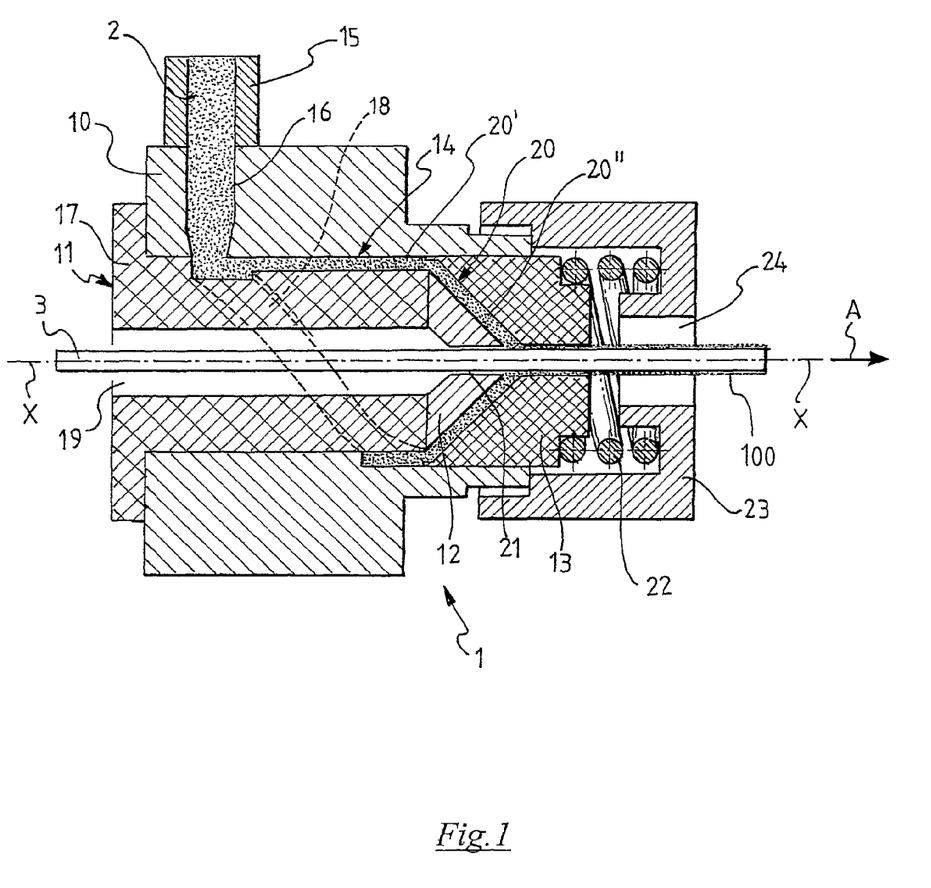
FIG. 1 is a schematic cross-sectional view of a first embodiment of an extrusion head in accordance with the present invention.

FIG. 1 schematically shows an extrusion head, indicated with reference number 1, for extruding a coating layer 100—made of a polymeric material 2—at a radially outer surface of an elongated element 3 advancing through the extrusion head 1 along a direction indicated by arrow A.

The extrusion head 1 has a longitudinal axis X-X and is part of an extrusion apparatus which is not illustrated in detail as being conventional per se.

As mentioned above, the extrusion head 1 of the present invention can be used in a process for manufacturing a tyre. In such a case, the elongated element 3 can be a metallic or synthetic thread-like element which is covered by extrusion with an elastomeric material to form an extruded element to be used in the manufacturing of tyre reinforcing structures, such as, for example, the carcass structure, the belt structure, the "bead cores".

According to the embodiment shown in FIG. 1, the extrusion head 1 comprises: a distributor element 11, a male die 12, a female die 13 and an annular body 10. The annular body 10 is coaxially arranged with respect to the distributor element 11, the male die 12 and the female die 13 and positioned radially external thereto.

In particular, the annular body 10 is provided with an inner cavity 14 coaxially extending with respect to the longitudinal axis X-X and suitable for housing the distributor element 11, the male die 12 and the female die 13.

The extrusion head 1 is further provided with an inlet duct 15 for feeding the polymeric material 2. The inlet duct 15 is associated to the annular body 10 at a feeding duct 16 which is formed in the annular body 10 and which extends, in the illustrated embodiment, in a direction substantially perpendicular to the axis X-X.

In a way known per se, for example through pipes not illustrated, the inlet duct 15 and the feeding duct 16 are in fluid communication with an extruder barrel provided with at least one extruder screw (not illustrated since conventional per se).

The distributor element 11 comprises a tubular body 17 on the outer surface of which is provided at least one pair of distribution channels 18, only one of which being shown by a dashed line in FIG. 1.

The tubular body 17 of the distributor element 11 is provided, similarly to the annular body 10, with an inner cavity 19 coaxially extending with the longitudinal axis X-X and intended for receiving the elongated element 3 advancing along the direction A.

In operation, preferably the advancing direction A of the elongated element 3 is substantially parallel to the longitudinal axis X-X of the extrusion head 1.

The extrusion head 1 further comprises an annular conveying channel 20. A first portion 20' of said conveying channel (i.e. the conveying channel portion positioned in proximity of the feeding duct 16) is coaxially defined between a radially inner surface of the annular body 10 and a radially outer surface of the tubular body 17 of the distributor element 11. A second portion 20" of said conveying channel (i.e. the conveying channel portion positioned in proximity of the exit of the extrusion head) is defined between the male die 11 and the female die 12.

The conveying channel 20 is used for conveying the polymeric material 2 to be deposited onto the outer surface of the elongated element 3. To this purpose, the conveying channel 20 defines a substantially annular and continuous passageway which is coaxial with the longitudinal axis X-X.

The distribution channels 18 are formed on the outer surface of the tubular body 17 and each channel is in fluid communication with the feeding duct 16.

In the embodiment illustrated in FIG. 1, the distribution channels 18 have a development of a curvilinear type, preferably of helical type, and extend on radially opposite sides with respect to the longitudinal axis X-X. Each distribution channel 18 carries out the function of distributing the polymeric material entering the inlet duct 15 as much homogeneously as possible in the conveying channel 20 so as to allow a uniform production of the desired coating layer 100.

Similarly to the annular body 10 and the tubular body 17 of the distributor element 11, the male die 12 and the female die 13 are provided with an inner cavity 21 for allowing the elongated element 3 to pass through, while the polymeric material 2—which flows in the conveying channel 20—is deposited on the outer surface of the elongated element 3.

In accordance with the present invention, the female die 13 is slidably associated with the annular body 10 so as to be axially movable with respect to the male die 12.

According to the present invention, the provision of a female die 13 which can be displaced with respect to the male die 12 allows the cross-sectional area of the second portion 20" of the conveying channel 20 to be modified during operation on the basis of the extrusion speed variation of the polymeric material 2.

To this purpose, the extrusion head 1 comprises a device for adjusting the cross-sectional area of the second portion 20" of the conveying channel 20 on the basis of said extrusion speed variation. In particular, said device acts on the female die 13 to adjust the position thereof with respect to the male die 12 along the longitudinal axis X-X in response to the extrusion speed variation.

According to an alternative embodiment (not shown), a similar result can be achieved by providing a device for adjusting the cross-sectional area of the second portion 20" of the conveying channel 20 which acts on a male die which is movable along the longitudinal axis X-X with respect to a stationary female die, i.e. to a female die that is in a fixed position.

In the embodiment illustrated in FIG. 1, the device for adjusting the position of the female die 13 with respect to the male die 12 along the longitudinal axis X-X comprises a resilient element 22 which is interposed between the female die 13 and a supporting element 23 at least partially fitted onto the annular body 10 by any conventional fastening means (not shown). The resilient element 22 illustrated in FIG. 1 is a spring. The supporting element 23 houses the spring 22 and is provided, at a free end thereof, with a passage 24 for allowing the elongated element 3, coated with the polymeric material 2, to advance along the direction A and to come out from the extrusion head 1.

The value of the elastic constant K of the resilient element 22 is calculated in such a way that the rigidity thereof can at least partially counteract the force exerted on the female die 13 by the polymeric material 2 flowing through the conveying channel 20 whatever is the extrusion speed (and thus the flow rate) of said material, said extrusion speed being comprised in the desired extrusion speed variation.

With reference to the embodiment of the extrusion head described above and illustrated in FIG. 1, the method according to the present invention for depositing by extrusion a polymeric material 2 on an elongated element 3 advancing in the extrusion head 1 along a direction A to obtain the coating layer 100 comprises the following steps.

In a first step, after having conveyed the elongated element 3 within the longitudinal cavity 19 of the extrusion head 1, the polymeric material 2 is fed into the feeding duct 16 of the extrusion head through the inlet duct 15. The polymeric material 2 is caused to flow into the conveying channel 20 through the distribution channels 18.

In a second step, the force exerted by the polymeric material 2 on the female die 13 is at least partially counteracted by the elastic force exerted by the spring 22 which allows an adjustment of the cross-sectional area of the second portion 20" of the conveying channel 20. Therefore, according to the present invention, the cross-sectional area of the second portion 20" of the conveying channel 20 is automatically regulated by adjusting the position of the female die 13 with respect to the male die 12 on the basis of the actual value of the desired extrusion speed (and thus of the resulting flow rate of the polymeric material 2 flowing through the conveying channel 20).

Therefore, in operation, it is advantageously possible to increase the flow rate of the polymeric material 2 flowing in the extrusion head 1, for example in order to increase the extruded element production yield, while ensuring at the same time that the values of pressure, temperature and period of permanency do not cause mechanical damages to the extrusion head 1 as well as scorching or overheating of the polymeric material.

Figure 5:
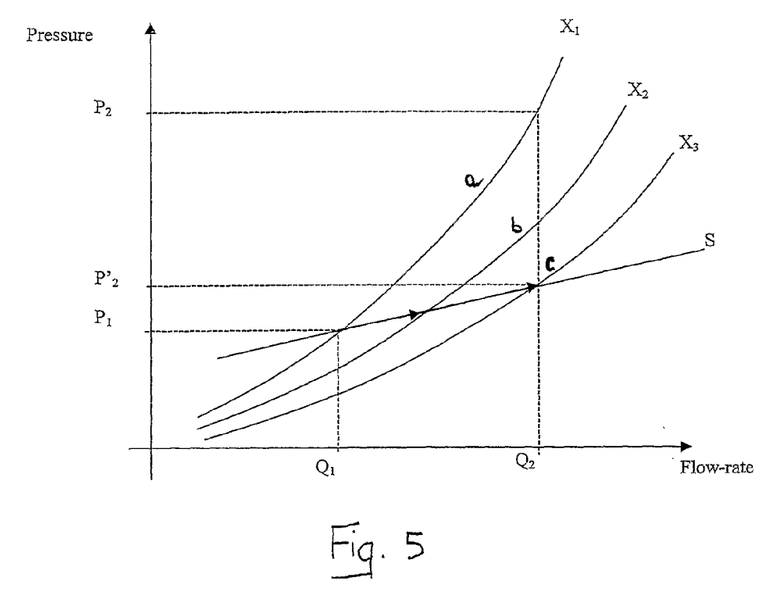
FIG. 5 is a graph showing the pressure variation of the polymeric material as a function of the flow rate thereof through an extrusion head in accordance with the present invention in comparison with a conventional extrusion head provided with a fixed geometry of the conveying channel.
Figure 6:
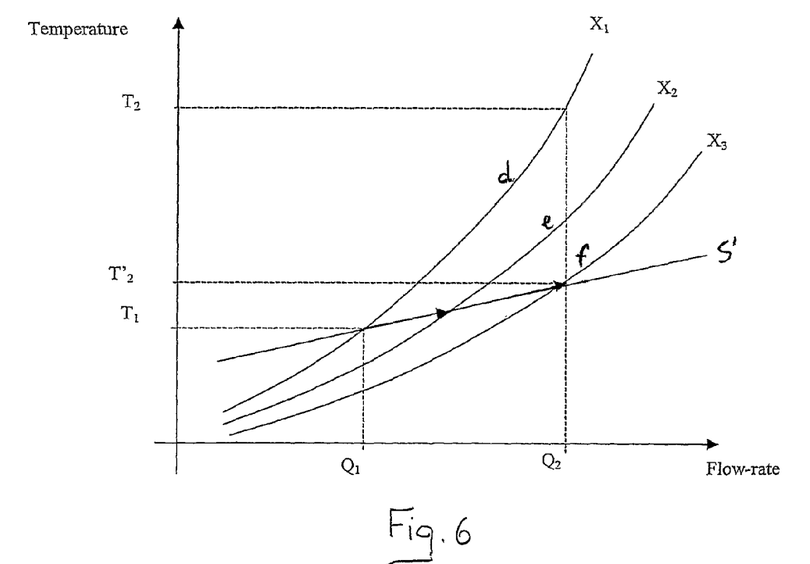
FIG. 6 is a graph showing the temperature variation of the polymeric material as a function of the flow rate thereof through an extrusion head in accordance with the present invention in comparison with a conventional extrusion head provided with a fixed geometry of the conveying channel.

This aspect is shown in detail in the graphs reported in FIGS. 5 and 6, wherein the variation of pressure and temperature, respectively, of the polymeric material as a function of the flow rate thereof through an extrusion head in accordance with the present invention in comparison with a conventional extrusion head provided with a fixed geometry of the conveying channel are shown.

With reference to the graph shown in FIG. 5, the variation of pressure as a function of the flow rate at three different positions ($X_1$, $X_2$, $X_3$) of the female die 13 along the longitudinal axis X-X is shown. In detail, the value of position $X_1$ is smaller than the value of position $X_2$ and the value of position $X_2$ is smaller than the value of position $X_3$ (i.e. $X_1 < X_2 < X_3$) while considering the female die axially moving according to the direction A, i.e. axially departing from the male die, so that the cross-sectional area of the second portion 20" of the conveying channel is caused to increase.

For each position of the female die, the variation of pressure as a function of flow rate (i.e. the pressure/flow rate curves indicated with references a, b, c respectively) is obtained by varying the flow rate value of the polymeric material and measuring the corresponding pressure value at the inlet duct of the extrusion head by means of a pressure sensor. In the case a conventional extrusion head (which is provided with a fixed geometry of the conveying channel, i.e. the female die and the male die are not reciprocally displaceable) is considered, the stationary female die of which being located at the position $X_1$, an increase of the flow rate of the polymeric material from $Q_1$ to $Q_2$ causes a corresponding increase of the pressure from $P_1$ to $P_2$. In fact, since the female die is stationary at the position $X_1$, the only possible path for passing from $Q_1$ to $Q_2$ is along curve a.

On the contrary, in the extrusion head of the present invention, an increase of the flow rate from $Q_1$ to $Q_2$ causes a displacement of the female die position from $X_1$ to $X_3$ so that it is possible to obtain the flow rate $Q_2$ at a pressure value $P'_2$ which is smaller than $P_2$ (the pressure value $P_2$ corresponds to the flow rate value $Q_2$ while moving along curve a, i.e. in the presence of a conventional extrusion head) since, according to the present invention, the path for passing from $Q_1$ to $Q_2$ is along curve S. The extremes of curve S are used to calculate the elastic constant K of the resilient element 22.

Similarly, with reference to the graph shown in FIG. 6, the variation of the temperature as a function of the flow rate at three different positions ($X_1$, $X_2$, $X_3$) of the female die 13 along the longitudinal axis X-X is shown. The female die axially moves according to the direction A, i.e. axially departs from the male die, so that the cross-sectional area of the second portion 20" of the conveying channel is caused to increase.

For each position of the female die, the variation of temperature as a function of flow rate (i.e. the temperature/flow rate curves indicated with references d, e, f respectively) is obtained by varying the flow rate value of the polymeric material and measuring the corresponding temperature value at the inlet duct of the extrusion head by means of a temperature sensor. In the case a conventional extrusion head (which is provided with a fixed geometry of the conveying channel, i.e. the female die and the male die are not reciprocally displaceable) is considered, the stationary female die of which being located at the position $X_1$, an increase of the flow rate of the polymeric material from $Q_1$ to $Q_2$ causes a corresponding increase of the temperature from $T_1$ to $T_2$. In fact, since the female die is stationary at the position $X_1$, the only possible path for passing from $Q_1$ to $Q_2$ is along curve d.

On the contrary, in the extrusion head of the present invention, an increase of the flow rate from $Q_1$ to $Q_2$ causes a displacement of the female die position from $X_1$ to $X_3$ so that it is possible to obtain the flow rate $Q_2$ at a temperature value $T'_2$ which is smaller than $T_2$ (the temperature value $T_2$ corresponds to the flow rate value $Q_2$ while moving along the curve d, i.e. in the presence of a conventional extrusion head) since, according to the present invention, the path for passing from $Q_1$ to $Q_2$ is along curve S'. The extremes of curve S' are used to calculate the elastic constant K of the resilient element 22.

Thus, with reference to the embodiments of the extrusion head 1 described above, the present invention allows to increase the flow rate of the polymeric material 2 flowing through the extrusion head 1 while ensuring at the same time that the values of pressure and temperature remain within an acceptable range of values, so as to avoid that critical flow conditions in the extrusion head can occur.

On the other hand, the present invention makes also advantageously possible to decrease the flow rate of the polymeric material in the extrusion head while ensuring, at the same time, that the values of pressure and period of permanency of the polymeric material remain within respective acceptable range of value, so as to avoid the formation of stagnation zones as well as scorching or overheating of the material being extruded.

Figure 7:
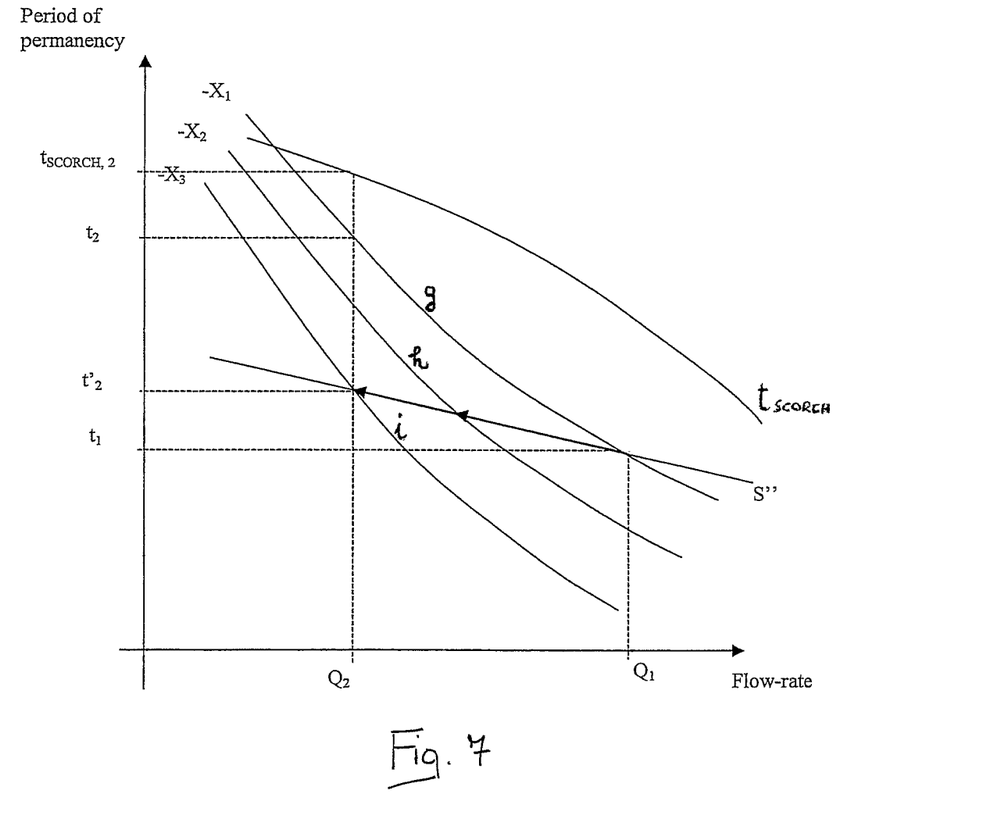
FIG. 7 is a graph showing the period of permanency of the polymeric material as a function of the flow rate thereof through an extrusion head in accordance with the present invention in comparison with a conventional extrusion head provided with a fixed geometry of the conveying channel.

This aspect is shown in the graph illustrated in FIG. 7, wherein the period of permanency of the polymeric material as a function of the flow rate at three different positions ($-X_1, -X_2, -X_3$) of the female die 13 along the longitudinal axis X-X is shown. The three different positions are indicated with negative values since in this case the movement of the female die with respect to the male die occurs in a direction opposite to that of arrow A; in fact, the cross-sectional area of the second portion 20'' of the conveying channel is caused to decrease.

For each position of the female die, the variation of the period of permanency as a function of the flow rate (i.e. the period of permanency/flow rate curves indicated with references g, h, i respectively) is obtained by varying the flow rate value of the polymeric material and calculating the corresponding period of permanency in the extrusion head. In the case a conventional extrusion head (which is provided with a fixed geometry of the conveying channel, i.e. the female die and the male die are not reciprocally displaceable) is considered, the stationary female die of which being located at the position $-X_1$, a reduction of the flow rate of the polymeric material from $Q_1$ to $Q_2$ causes a corresponding increase of the period of permanency from $t_1$ to $t_2$. However, the value $t_2$ is quite close to the critical value $t_{scorch,2}$ which represents the period of permanency at which scorching of the polymeric material occurs (indicated by the curve $t_{scorch}$). In fact, since the female die is stationary at the position $-X_1$, the only possible path for passing from $Q_1$ to $Q_2$ is along curve g.

On the contrary, in the extrusion head of the present invention, a reduction of the flow rate from $Q_1$ to $Q_2$ causes a displacement of the female die position from $-X_1$ to $-X_3$ so that it is possible to obtain the flow rate $Q_2$ at a period of permanency $t'_2$ which is smaller than $t_2$ (the period of permanency $t_2$ corresponds to the flow rate value $Q_2$ while moving along the curve g, i.e. in the presence of a conventional extrusion head) since, according to the present invention, the path for passing from $Q_1$ to $Q_2$ is along curve S''. The extremes of curve S'' are used to calculate the elastic constant K of the resilient element 22. Therefore, according to the present invention, the period of permanency increases from $t_1$ to $t'_2$, the latter being smaller than $t_2$ and far away from the critical value $t_{scorch,2}$.

Figure 2:
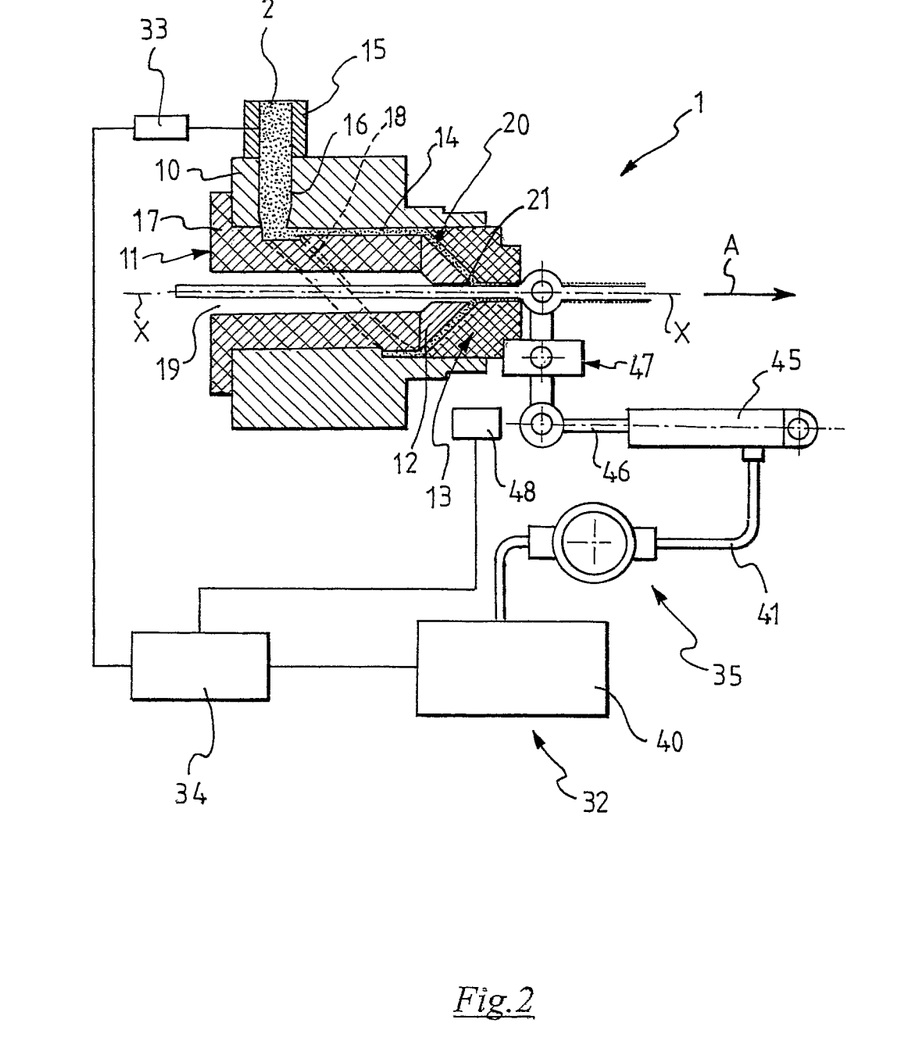
FIG. 2 is a schematic cross-sectional view of a second embodiment of an extrusion head in accordance with the present invention.
Figure 3:
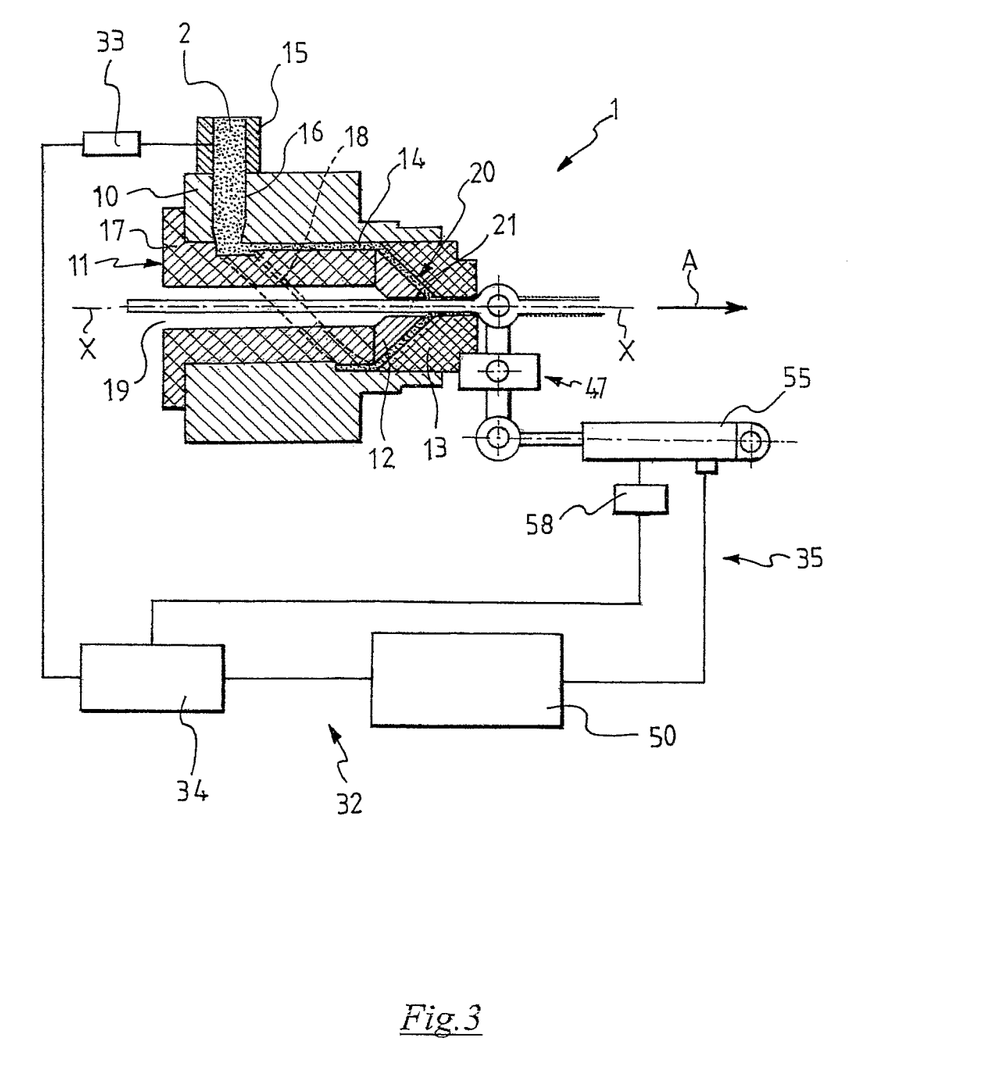
FIG. 3 is a schematic cross-sectional view of a third embodiment of an extrusion head in accordance with the present invention.
Figure 4:
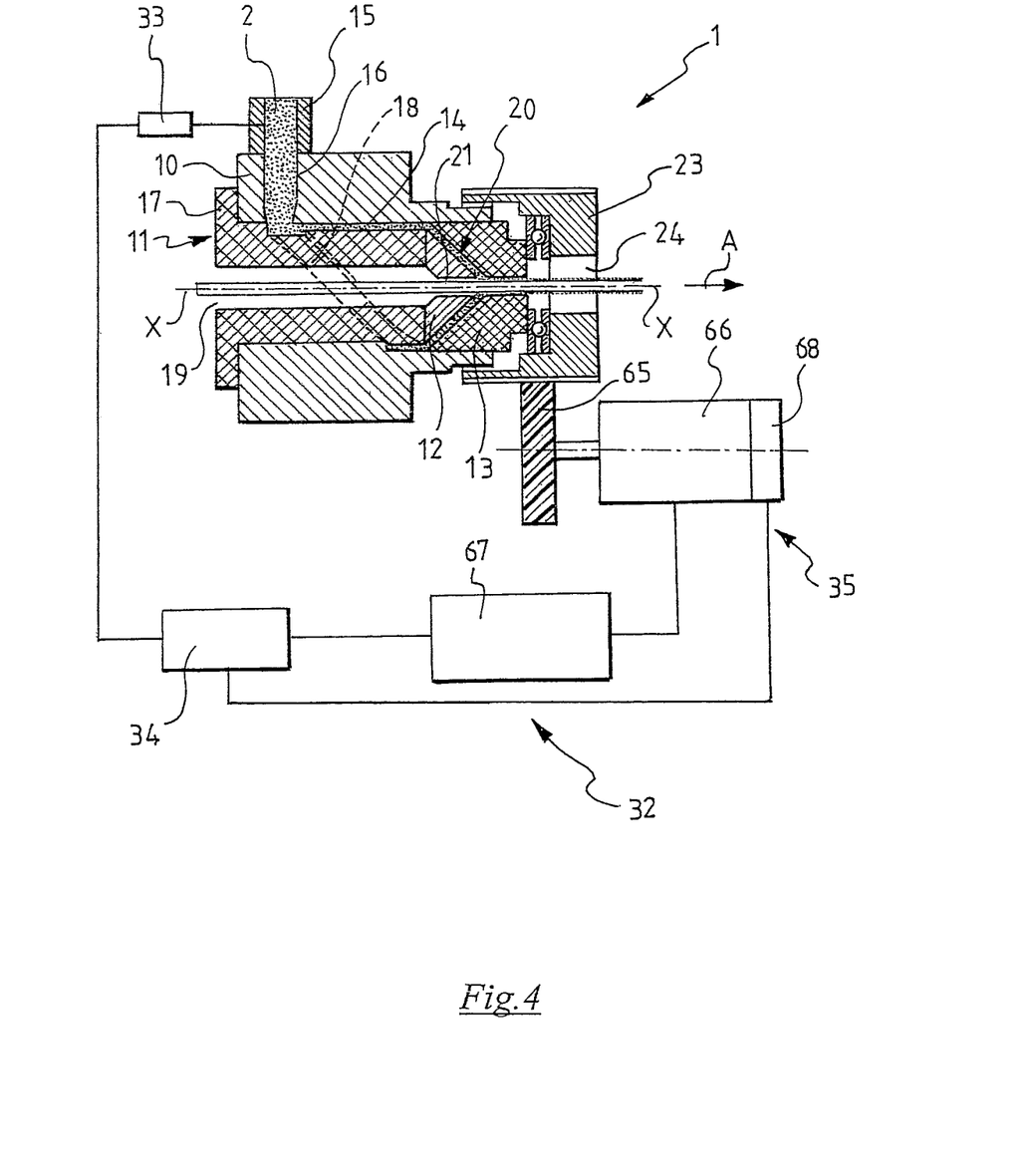
FIG. 4 is a schematic cross-sectional view of a fourth embodiment of an extrusion head in accordance with the present invention.

In FIGS. 2 to 4 further embodiments of the extrusion head according to the present invention are shown.

The elements of the extrusion head which are structurally and/or functionally equivalent to those previously illustrated with reference to FIG. 1 are indicated with the same reference numbers.

The embodiments shown in FIGS. 2 to 4 differ from that reported in FIG. 1 in that the device for adjusting the position of the female die 13 with respect to the male die 12 along the longitudinal axis X-X comprises, in place of the resilient element 22, a servo-device 32 which detects the extrusion speed variations (and thus the polymeric material flow rate and pressure variations) and adjusts the position of the female die 13 with respect to the male die 12 along said longitudinal axis X-X on the basis of the detected variations.

In particular, in the embodiments illustrated in FIGS. 2 to 4, the servo-device 32 comprises a pressure sensor 33 associated with the extrusion head 1 at the inlet duct 15.

The servo-device 32 further comprises a processing device 34 operatively associated with the pressure sensor 33. The processing device 34 calculates the new positions of the female die 13 along the longitudinal axis X-X in response to the variations detected by the pressure sensor 33.

The servo-device 32 further comprises a device 35 for moving the female die 13 to the calculated new positions, said device 35 being operatively associated with the processing device 34.

In the embodiment illustrated in FIG. 2, the device 35 for moving the female die 13 to the new positions calculated by the processing device 34 comprises a hydraulic actuator which includes a pump 40 and a hydraulic cylinder 45 reciprocally connected by means of a connecting duct 41.

The pump 40 is operatively associated with the processing device 34, while the hydraulic cylinder 45 comprises a stem 46 that is connected to the female die by the interposition of a crank gear 47.

According to this embodiment, a position sensor 48 is associated with the stem 46 of the hydraulic cylinder 45 and with the processing device 34 to detect the position of the stem 46 (this position corresponding to a respective position of the female die 13) and to send a corresponding electrical signal to the processing device 34 to allow the latter to calculate a possible new position for the stem 46.

According to a further embodiment of the present invention (not shown), the hydraulic actuator is replaced by a pneumatic actuator. Specifically, the pump 40 is replaced by a container of pressurized fluid, while the hydraulic cylinder 45 is replaced by a pneumatic cylinder.

FIG. 3 shows a further embodiment of the extrusion head 1 of the present invention.

The elements of the extrusion head which are structurally and/or functionally equivalent to those previously illustrated with reference to FIGS. 1 and 2 are indicated with the same reference numbers.

The embodiment shown in FIG. 3 differs from that of FIG. 2 in that the device 35 for moving the female die 13 to the new position calculated by the processing device 34 comprises a linear actuator 55. The linear actuator 55 is provided with a driving means (not shown) which are operated and regulated by a processor 50.

According to this embodiment, a position sensor 58 is associated with the linear actuator 55 and with the processing device 34 to detect the position of the female die 13 and to send a corresponding electrical signal to the processing device 34 to allow the latter to calculate any possible new position for the female die 13.

FIG. 4 shows a further embodiment of the extrusion head 1 of the present invention.

The elements of the extrusion head which are structurally and/or functionally equivalent to those previously illustrated with reference to FIGS. 1, 2 and 3 are indicated with the same reference numbers.

The embodiment of FIG. 4 differs from that of FIGS. 2 and 3 in that the device 35 for moving the female die 13 to the new position calculated by the processing device 34 comprises a gear electro-mechanical device including a gear mechanism 65 driven by an electric motor 66 and coupled with the female die 13. The gear mechanism 65 which is coupled with the female die 13 is housed in a supporting element 23 of the type illustrated and disclosed with respect to FIG. 1. The gear electro-mechanical device further comprises a processor 67 which operates and regulates the electric motor 66. The processor 67 is associated with the electric motor 66 and with the processing device 34.

According to this embodiment, a position sensor 68 is associated with the electric motor 66 and with the processing device 34 to detect the position of female die 13 and to send a corresponding electrical signal to the processing device 34 to allow the latter to calculate a possible new position of the female die 13.

With reference to the preferred embodiments of the extrusion head 1 described above and illustrated in FIGS. 2 to 4, the method of the present invention for depositing by extrusion a polymeric material 2 on an elongated element 3 advancing within the extrusion head 1 along a direction A comprises the following steps.

In a first step, similarly to the method described above with respect to the extrusion head 1 illustrated in FIG. 1, after having conveyed the elongated element 3 within the longitudinal cavity 19 of the extrusion head 1, the polymeric material 2 is fed to the feeding duct 16 of the extrusion head through the inlet duct 15 by one or more extruder screws (known per se and not shown in the figures). The polymeric material 2 is caused to flow into the conveying channel 20 through the distribution channels 18.

In a second step, the pressure sensor 33 detects—preferably at a predetermined frequency value—the pressure at the inlet duct of the extrusion head (said pressure value being correlated to the flow rate value and the latter being, in turn, correlated to the extrusion speed value) and generates a corresponding electrical signal which is sent to the processing device 34.

Once a pressure variation is detected, in a third step of the method of the present invention the processing device 34 calculates a new position of the female die 13 along the longitudinal axis X-X on the basis of the detected variation and sends a corresponding signal to the actuator device 35 which moves the female die 13 to the calculated new position, thus adjusting the cross-sectional area of the second portion 20" of the conveying channel 20. As mentioned above, since this cross-sectional area is correlated to the pressure (and thus to the flow rate) of the polymeric material flowing through the extrusion head, the possibility of adjusting this area allows to extend the working field of the extrusion head. In other words, according to the present invention it is possible to increase the range of variation of the flow rate of the polymeric material flowing through the extrusion head while ensuring that the other process parameters (in particular, temperature and period of permanency) remain within acceptable ranges of values so that critical flow conditions (and thus scorches, overheating, stagnations of the polymeric material as well as mechanical damages of the extrusion head) do not substantially occur.

The considerations given herein above with respect to the graphs reported in FIGS. 5, 6 and 7 apply also to the embodiments shown in FIGS. 2 to 4, with the only exceptions that the extremes of curves S' and S", along which the female die 13 moves from position $|X_1|$ to position $|X_3|$, are used to calculate the calibration of the actuator device 35 instead of the elastic constant K of the resilient element 22 of FIG. 1.

The invention claimed is:

1. A method for extruding a polymeric material comprising the steps of:
   feeding said polymeric material to an extrusion apparatus comprising an extrusion head, said extrusion head comprising:
      a male die;
      a female die coaxially arranged with respect to said male die, wherein one die of said male die and said female die is axially displaceable with respect to the other die along an axial direction of said extrusion head;
      a conveying channel, at least one portion of which is defined between said male die and said female die; and
   adjusting a cross-sectional area of said at least one portion of the conveying channel by reciprocally displacing said female die with respect to said male die in response to an extrusion speed variation of said polymeric material, including passively displacing said axially displaceable die with respect to the other die along said axial direction by a spring force exerted by a resilient element;
   wherein the magnitude of the spring force is substantially equal to a force exerted by the polymeric material acting on the female die.

2. The method according to claim 1, wherein said force is substantially parallel to an extrusion head longitudinal axis.

3. The method according to claim 1, wherein said resilient element is associated with the at least one die which is allowed to be axially displaced.

4. The method according to claim 1, further comprising the step of extruding said polymeric material.

5. The method according to claim 4, further comprising the step of choosing the extrusion speed variation of the polymeric material in response to the working conditions of a process step subsequent to the extrusion step.

6. The method according to claim 1, further comprising:
   advancing an elongated element through said extrusion head; and
   extruding said polymeric material onto said elongated element.

7. A method for extruding a polymeric material comprising the steps of:
   feeding said polymeric material to an extrusion apparatus comprising an extrusion head, said extrusion head comprising:
      a male die;
      a female die coaxially arranged with respect to said male die, wherein one die of said male die and said female die is axially displaceable with respect to the other die along an axial direction of said extrusion head;
      a conveying channel, at least one portion of which is defined between said male die and said female die;
   adjusting a cross-sectional area of said at least one portion of the conveying channel by reciprocally displacing said axial displaceable die with respect to the other die along said axial direction by means of a resilient element in response to an extrusion speed variation of said polymeric material;
   advancing an elongated element through said extrusion head; and
   extruding said polymeric material onto said elongated element.

8. The method according to claim 7, wherein the step of adjusting the cross-sectional area of the at least one portion of the conveying channel comprises the step of partially counteracting the force exerted on at least one die by the polymeric material flowing in the conveying channel.

9. The method according to claim 8, wherein said force is exerted by the polymeric material acting on the female die.

10. The process according to claim 7, wherein said polymeric material is an elastomeric material.

11. The process according to claim 7, wherein said elongated element is a thread-like element.

12. A method for extruding a polymeric material comprising the steps of:
feeding said polymeric material to an extrusion apparatus comprising an extrusion head, said extrusion head comprising:
a male die;
a female die coaxially arranged with respect to said male die, wherein one die of said male die and said female die is axially displaceable with respect to the other die along an axial direction of said extrusion head;
a conveying channel, at least one portion of which is defined between said male die and said female die; and
adjusting a cross-sectional area of said at least one portion of the conveying channel by reciprocally displacing said female die with respect to said male die in response to an extrusion speed variation of said polymeric material, including displacing said axially displaceable die with respect to the other die along said axial direction by means of a resilient element;
wherein said polymeric material exerts a force on a first side of said axially displaceable die and said resilient element exerts a spring force on a second side of said axially displaceable die, wherein said second side is opposite to said first side along said axial direction.

13. The process according to claim 12, wherein said second side is located downstream from said first side.

* * * * *